(12) United States Patent
Mann et al.

(10) Patent No.: US 9,749,619 B2
(45) Date of Patent: Aug. 29, 2017

(54) SYSTEMS AND METHODS FOR GENERATING STEREOSCOPIC IMAGES

(71) Applicant: MICROSOFT TECHNOLOGY LICENSING, LLC, Redmond, WA (US)

(72) Inventors: Samuel A. Mann, Redmond, WA (US); Robert M. Craig, Redmond, WA (US); John A. Tardif, Redmond, WA (US); Joseph C. Bertolami, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 513 days.

(21) Appl. No.: 13/664,644

(22) Filed: Oct. 31, 2012

(65) Prior Publication Data
US 2013/0057543 A1    Mar. 7, 2013

Related U.S. Application Data

(63) Continuation of application No. 12/416,406, filed on Apr. 1, 2009, now Pat. No. 8,314,832.

(51) Int. Cl.
*H04N 13/04* (2006.01)
*G06T 15/00* (2011.01)
(Continued)

(52) U.S. Cl.
CPC ......... *H04N 13/0497* (2013.01); *G06F 3/011* (2013.01); *G06F 3/013* (2013.01);
(Continued)

(58) Field of Classification Search
CPC ..... G06F 3/011; G06F 3/013; H04N 13/0497; H04N 13/0011; H04N 13/004;
(Continued)

(56) References Cited

U.S. PATENT DOCUMENTS 5,855,425 A * 1/1999 Hamagishi ........................ 353/7
5,872,590 A * 2/1999 Aritake et al. .................. 348/57
(Continued)

OTHER PUBLICATIONS

Bimber, et al., "Enabling View-Dependent Stereoscopic Projection in Real Environments", Computer Science, Germany, 2005, 10 pages.
(Continued)

*Primary Examiner* — Mohammed Jebari
(74) *Attorney, Agent, or Firm* — Baker & Hostetler LLC

(57) ABSTRACT

Systems and methods are disclosed for generating stereoscopic images for a user based on one or more images captured by one or more scene-facing cameras or detectors and the position of the user's eyes or other parts relative to a component of the system as determined from one or more images captured by one or more user-facing detectors. The image captured by the scene-facing detector is modified based on the user's eye or other position. The resulting image represents the scene as seen from the perspective of the eye of the user. The resulting image may be further modified by augmenting the image with additional images, graphics, or other data. Stereoscopic mechanisms may also be adjusted or configured based on the location or the user's eyes or other parts.

20 Claims, 9 Drawing Sheets

(51) Int. Cl.
*G06T 15/30* (2011.01)
*G06F 3/01* (2006.01)
*H04N 13/00* (2006.01)
*H04N 13/02* (2006.01)

(52) U.S. Cl.
CPC ....... *H04N 13/004* (2013.01); *H04N 13/0011* (2013.01); *H04N 13/0239* (2013.01); *H04N 13/0402* (2013.01); *H04N 13/0429* (2013.01); *H04N 13/0468* (2013.01); *H04N 13/0475* (2013.01); *H04N 13/0477* (2013.01); *H04N 13/0484* (2013.01); *H04N 13/0404* (2013.01); *H04N 13/044* (2013.01); *H04N 13/0409* (2013.01); *H04N 13/0438* (2013.01); *H04N 13/0481* (2013.01)

(58) Field of Classification Search
CPC ........... H04N 13/0239; H04N 13/0402; H04N 13/0429; H04N 13/0468; H04N 13/0404; H04N 13/0409; H04N 13/0438; H04N 13/044; H04N 13/0475; H04N 13/0477; H04N 13/0481; H04N 13/0484; H04N 13/04; G06T 15/00; G06T 15/30
See application file for complete search history.

(56) References Cited

U.S. PATENT DOCUMENTS

| | | | |
|---|---|---|---|
| 5,880,883 A * | 3/1999 | Sudo | 359/462 |
| 6,133,944 A | 10/2000 | Braun et al. | |
| 6,160,527 A * | 12/2000 | Morishima et al. | 345/7 |
| 6,163,336 A | 12/2000 | Richards | |
| 6,191,808 B1* | 2/2001 | Katayama et al. | 348/39 |
| 6,198,484 B1* | 3/2001 | Kameyama | 345/419 |
| 6,201,517 B1 | 3/2001 | Sato | |
| 6,414,681 B1* | 7/2002 | Ohshima et al. | 345/428 |
| 6,771,277 B2 | 8/2004 | Ohba | |
| 7,391,424 B2 | 6/2008 | Lonsing | |
| 7,982,751 B2 | 7/2011 | Stotts et al. | |
| 8,866,809 B2* | 10/2014 | McCarthy | 345/419 |
| 2002/0063957 A1* | 5/2002 | Kakizawa | 359/462 |
| 2003/0107643 A1 | 6/2003 | Yoon | |
| 2003/0107645 A1 | 6/2003 | Yoon | |
| 2004/0135744 A1 | 7/2004 | Bimber et al. | |
| 2005/0122401 A1* | 6/2005 | Horie | H04N 5/23293 348/207.99 |
| 2006/0038880 A1 | 2/2006 | Starkweather et al. | 348/51 |
| 2006/0038881 A1 | 2/2006 | Starkweather et al. | |
| 2006/0044399 A1* | 3/2006 | Fredlund | H04N 5/23293 348/207.99 |
| 2006/0132915 A1 | 6/2006 | Yang et al. | |
| 2006/0210111 A1 | 9/2006 | Cleveland et al. | |
| 2006/0232665 A1 | 10/2006 | Schowengerdt et al. | |
| 2008/0080846 A1* | 4/2008 | Grip | G02B 7/287 396/51 |
| 2008/0111832 A1* | 5/2008 | Emam | G02B 27/017 345/633 |
| 2008/0231805 A1 | 9/2008 | Schwerdtner | |
| 2009/0295832 A1* | 12/2009 | Takatsuka | G06F 3/012 345/659 |
| 2010/0111363 A1* | 5/2010 | Kelly | G06F 21/316 382/103 |
| 2010/0125816 A1* | 5/2010 | Bezos | 715/863 |

OTHER PUBLICATIONS

Henrysson, A., "Bringing augmented reality to mobile phones", National Graduate School of Computer Science, No. 1145, 2007, pp. 1-70.

Kanbara, M., et al., "Real-time composition of stereo images for video see-through augmented reality", Graduate School of Information Science, Nara Institute of Science and Technology, Japan, 1999, pp. 213-219.

Nakagawa, M., et al., "Gaze tracking control using an active stereo camera", The International Archives of the Photogrammetry, Remote Sensing and Spatial Information Sciences, vol. XXXVII, Part B3b, Beijing, 2008, pp. 387-392.

Olwal, A., et al., "ASTOR:An autostrereoscopic optical see-through augmented reality system", ISMAR, Vienna, Austria, Oct. 5-8, 2005, pp. 24-27.

Perlin, K., et al., "Recent advances in the NYU autostereoscopic display", 8 pages.

Wagner, D., et al., "Towards massively multi-user augmented reality on handheld devices", 12 pages.

Thomas Riisgaard Hansen, Eva Eriksson, and Andreas Lykke-Olesen. "Use Your Head: Exploring Face Tracking for Mobile Interaction", Apr. 22-27, 2006, CHI '06 CHI 2006 Conference on Human Factor in Computing Systems, Montreal, Canada, pp. 845-850.

Thomas Riisgaard Hansen, Eva Eriksson, and Andreas Lykke-Olesen. "Mixed Interaction Space—Expanding the Interaction Space with Mobile Devices", 2006, People and Computers XIX—The Bigger Picture 2006, Part 3, pp. 365-380.

* cited by examiner

SYSTEMS AND METHODS FOR GENERATING STEREOSCOPIC IMAGES

CROSS-REFERENCE TO RELATED APPLICATIONS

This application is a continuation of, and claims priority to, U.S. patent application Ser. No. 12/416,406, filed Apr. 1, 2009, entitled "Systems and Methods for Generating Stereoscopic Images," now U.S. Pat. No. 8,314,832, the entire contents of which are hereby incorporated herein by reference.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the patent and trademark office patent files or records, but otherwise reserves all copyright rights whatsoever. The following notice shall apply to this document: Copyright © 2009, Microsoft Corp.

BACKGROUND

Stereoscopy, also known as stereoscopic imaging or three-dimensional (3-D) imaging is a technique of presenting visual information that creates the illusion of depth. Often this illusion is created by presenting a different image to each eye. One way to create an illusion of depth is to provide the eyes of the viewer with two different images, representing two perspectives of the same object, with a minor deviation similar to the perspectives that both eyes naturally receive in binocular vision. The object is to present to each image an image as it would be seen by each eye if each eye was viewing the objects in the image in the physical world.

There are several methods of creating a stereoscopic effect known in the art, including presenting completely distinct and separate images to each of a viewer's eyes, and presenting two images on a single viewing area, such as a movie screen, and filtering the images through polarized glasses with differently polarized lenses for each eye. Another method is known as wiggle stereoscopy, where images intended for the left eye and images intended for the right eye are rapidly alternated on a display. Yet another method is autostereoscopy, which can be implemented in a variety of ways, including by displaying images on a display with two layers, such as a specially configured liquid crystal display (LCD), with each layer configured to display images a few degrees to the left or right. These images are intended to be seen only by the right or left eye, creating a three-dimensional effect when viewed with both eyes at once. Additional components, such as shutter glasses or other types of headgear may be used with such displays to improve the stereoscopic effects by allowing each eye to only see the portion of an image that is intended for that eye. Alternatively, a display may be configured with a series of slits, sometimes referred to as a parallax barrier, or lenticular lenses that magnify different parts of image depending on the angle of view. These configurations allow each eye to see a different set of pixels or a different portion of an image, thereby creating a sense of depth through parallax.

Augmented reality is the combining of real world data and computer-generated data to create a user environment. Real world data may be collected using any suitable data collection means, such as a camera, microphone, light and/or heat detector, or any other detection mechanism. This data may then be processed and combined with computer generated data to create the user environment. One of the most common forms of augmented reality is the use of live video images captured with a camera that are processed and augmented with computer-generated graphics or other images. The resulting augmented video images are then presented to a user through a user interface, such as a video monitor. Augmented reality can be used in video games, mapping, navigation, advertising, architecture visualization, and numerous other applications.

Live video images captured for augmented reality use may be images of the physical environment surrounding the user. This allows a user to interact with a virtual reality environment while still interacting with the actual physical environment around the user. A limitation of the current technology used to implement augmented reality is the images presented to a user may not actually reflect the viewpoint of the user because these images do not take into account the actual position of the user in the physical environment. These images may also lack the depth and three-dimensionality of viewing an area or object in the actual physical environment.

SUMMARY

Systems, methods, and computer-readable media are disclosed for generating stereoscopic images in a stereoscopic device or system. One or more scene-facing images may be captured on one or more scene-facing detectors, such as cameras, while one or more user-facing images may be captured on one or more user-facing detectors, which may also be cameras. The position or location of a user's eye relative to a device or display may be determined from one or more of the user-facing images. Alternatively, the position of another part of the user, such as the user's head, or the user as a whole, relative to a device or display may be determined from user-facing images. In one embodiment, the location of the user's eyes may be estimated from the determined location of another part of the user.

Based on the position or location of the user's eyes or other parts relative to a device or display, a portion of the scene-facing images may be determined and cropped from the scene-facing images to create images to present to the user's eyes. The resulting cropped image may then be rendered on one or more displays for viewing by the user. Additional alterations may be made to an image before it is presented to a user. For example, additional images, graphics, text, etc. may be overlaid on or composited with a cropped image. Various means may be used to determine positions or locations of a user or parts of a user from user-facing images. Also provided herein are methods for determining a cropping location and cropping area dimensions based on the determined positions or location.

Other adjustments may be made to a stereoscopic system or device based on the location or position of a user or parts of a user. For example, in a stereoscopic display configured with stereoscopic components, such as parallax barriers or lenticular lenses, these components may be adjusted based on the position or location of a user's eyes to optimize the stereoscopic effects of images presented to the user. Various other adjustments or configurations may be put in place based on the determined positions or locations.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings.

DETAILED DESCRIPTION OF ILLUSTRATIVE EMBODIMENTS

Stereoscopic Device

Figure 1A:
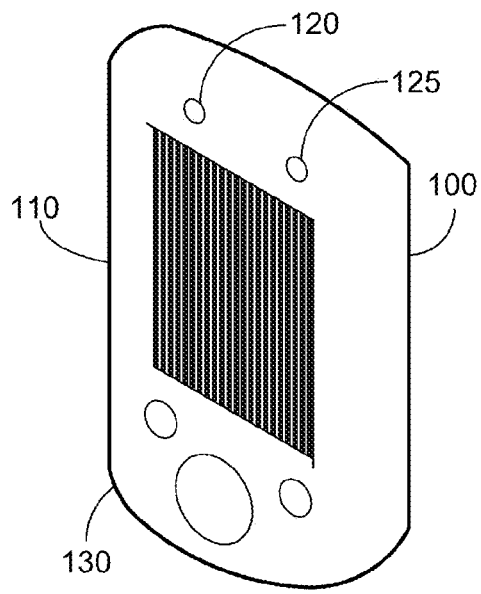
FIG. 1a is a graphical representation of one side of a device that may be used to implement parts of or a complete stereoscopic device or system.
Figure 1B:
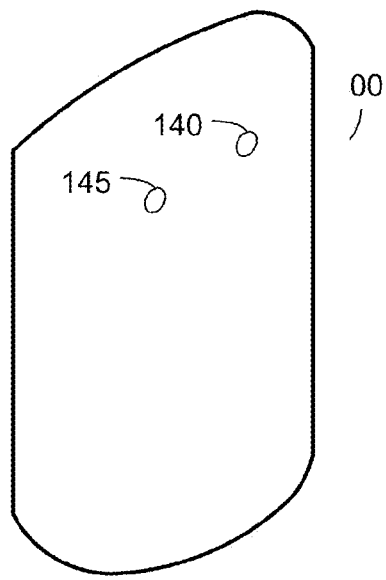
FIG. 1b is a graphical representation of another side of a device that may be used to implement parts of or a complete stereoscopic device or system.

A stereoscopic device and/or related devices, systems, and methods may be implemented using a variety of devices and configurations. FIGS. 1a and 1b illustrate an exemplary, non-limiting device 100 that may be used as a stereoscopic device. Device 100 may be any device capable of implementing the systems and/or methods disclosed herein, such as a dedicated stereoscopic device, an augmented reality user interface device, or any other device capable of implementing a stereoscopic device or stereoscopic image effects. Alternatively, device 100 may perform one or more aspects of a stereoscopic device or system and work in conjunction with one or more other devices to implement a complete stereoscopic device or system. Device 100 may also be integrated into one or more other devices that are capable of performing other activities beyond implementing a stereoscopic device or system. Such devices may include a personal data assistant (PDA), a mobile telephone, a laptop or desktop computer, a mobile or stationary gaming system, a virtual reality helmet system, a stereoscopic eyewear, helmet or headgear, a camera, a video display for a computing system, or any other device capable of implementing stereoscopic device or system and performing at least one other function. All such configurations and devices are contemplated as within the scope of the present disclosure.

FIG. 1a displays a user-facing side of device 100. On the user-facing side, device 100 may have a display 110 that may be any type of display capable of displaying video or still stereoscopic images. Display 110 may be a liquid crystal display (LCD), a cathode ray tube (CRT), a plasma display, a light-emitting diode (LED) display, an image projection device, or any other type if display or device capable of presenting a stereoscopic image, or dual stereoscopic images, visible to a user. Display 110 may incorporate a parallax barrier or lenticular lenses that facilitate the accessing or viewing of distinct parts of the image displayed by a user's two eyes. Alternatively, display 110 may incorporate components or elements that facilitate the display of two different images on display 110, with each of the images intended for viewing by one of a user's two eyes. Such elements may be mechanical, electrical, implemented in software, or any combination of these. Other components or elements that facilitate the production of stereoscopic images or stereoscopic effects are contemplated as part of display 110.

Device 100 may also have more than one display. For example, device 100 may be a stereoscopic headgear with two separate displays, one for each eye, that create a three-dimensional effect when viewed. Multiple display configurations may be made up of multiple displays of the same type, or several different types of displays.

Device 100 may be configured with various user controls 130, which may include buttons, dials, touch pads, keyboards, microphones, light or heat detection components, and any other type of user interface. All such configurations are contemplated as within the scope of the present disclosure.

Device 100 may be configured with user-facing detector 120 that may be any type of detection component capable of detecting the position of a user or a part of a user relative to device 100, such as a user's eye, or detecting a representation of user or a part of a user. In one embodiment, user-facing detector 120 may be a standard camera capable of capturing one or more still images or video images. In another embodiment, user-facing detector 120 may be a detection device capable of detecting a user or the position of a user or any part or representation of a user relative to device 100 through the detection of heat, sound, light, other types of radiation, or any other detectable characteristics. Examples of such detectors include, but are not limited to, infrared detectors, thermal detectors, orientation detectors, and sound/acoustic detectors. Device 100 may have more than one user-facing camera or detection device, such as secondary user-facing detector 125. Multiple detection devices or components may be used to detect a user, part of a user, or a representation of a user or part of a user in three-dimensional space. Any number and type of detection devices configured on the user-facing side of a device that are configured to detect a user or one or more parts of a user, or a representation of a user or one or more parts of a user, are contemplated as within the scope of the present disclosure.

When configured with two detectors, each detector may be dedicated to detecting the position of one of a user's eyes. For example, detector 120 may be dedicated to detecting the position of a user's left eye relative to device 100, and detector 125 may be dedicated to detecting the position of a user's right eye relative to device 100. Alternatively, images captured by two detectors may be used together to determine the position of each eye. For example, detector 120 and detector 125 may both capture an image of both of a user's eyes, and these images may be processed together to determine the location or position of each eye relative to device 100.

In another embodiment, a single detector may be configured to detect the position of each eye relative to device 100. For example, using a single image captured by detector 120, device 100 may calculate the position of the user's right eye and the user's left eye relative to device 100. In another alternative, detector 120 may capture a first image that is used by device 100 to calculate the position of a user's left eye relative to device 100, and then may capture a second image that is used by device 100 to calculate the position of a user's right eye relative to device 100. Any such calculation may be performed on a directly determined position of each of the user's eyes, or may be performed by determining the position of the user's head, other body part, or whole body, and then calculating an assumed position of the user's eyes. The images and/or calculations may be performed in rapid sequence, and/or may be performed continuously, so that a near real-time position of each of a user's eyes may be determined on an ongoing basis during the execution of a stereoscopic application. All such configurations and calculations are contemplated as within the scope of the present disclosure. Further detail on calculating user position is provided herein.

FIG. 1*b* illustrates the scene-facing side of device 100. One or more detectors, such as scene-facing detectors 140 and 145, may be configured on the scene-facing side of device 100. Scene-facing detectors 140 and 145 may be any type of detector or camera that is capable of capturing an image or detecting information about a physical space within its range, including the types of detectors and camera described in regard to user-facing detectors 120 and 125.

Scene-facing detectors 140 and 145 may be dedicated to capturing images that may be processed by device 100 or another device and presented to a particular eye of a user. For example, detector 140 may be configured to capture an image that is processed and presented to a user's left eye, while detector 145 may be configured to capture an image that is processed and presented to a user's right eye. Alternatively, a single detector may be configured to detect one image that is then processed to produce two images, one for each of a user's eyes. For example, using a single image captured by detector 140, device 100 may process the image twice, creating an image for each of the user's right eye and the user's left eye. In another alternative, detector 140 may capture a first image that is used by device 100 to process an image to be displayed to the user's left eye, and then may capture a second image that is used by device 100 to process an image to be displayed to the user's right eye. These images and/or calculations also may be performed in rapid sequence, and/or may be performed continuously, so that a near real-time image of the area or space captured by detectors 140 and/or 145 can be presented to a user on an ongoing basis during the execution of a stereoscopic application. All such configurations and calculations are contemplated as within the scope of the present disclosure. Further detail on calculating such images is provided herein.

Device 100 may also be configured with computing and communications components not shown in FIGS. 1*a* and 1*b*. The various components that may be integrated into device 100 and/or a stereoscopic device or system are described in more detail herein, including in the sections describing FIGS. 8 and 9.

While device 100 as shown in FIGS. 1*a* and 1*b* has a single unit housing all the described components, the components and devices used in a stereoscopic device or system may be physically separate. For example, user-facing detectors and scene-facing detectors may be physically separate from one or more displays and each other and located in separate housings. Moreover, other components, such as processors, memory, storage devices, etc. may be located in one or more physically distinct devices or components. Such devices or components may communicate with each other using communications technologies known in the art, including wired and wireless communications technologies. All such implementations and configurations of a stereoscopic device or system are contemplated as within the scope of the present disclosure.

Figure 2:
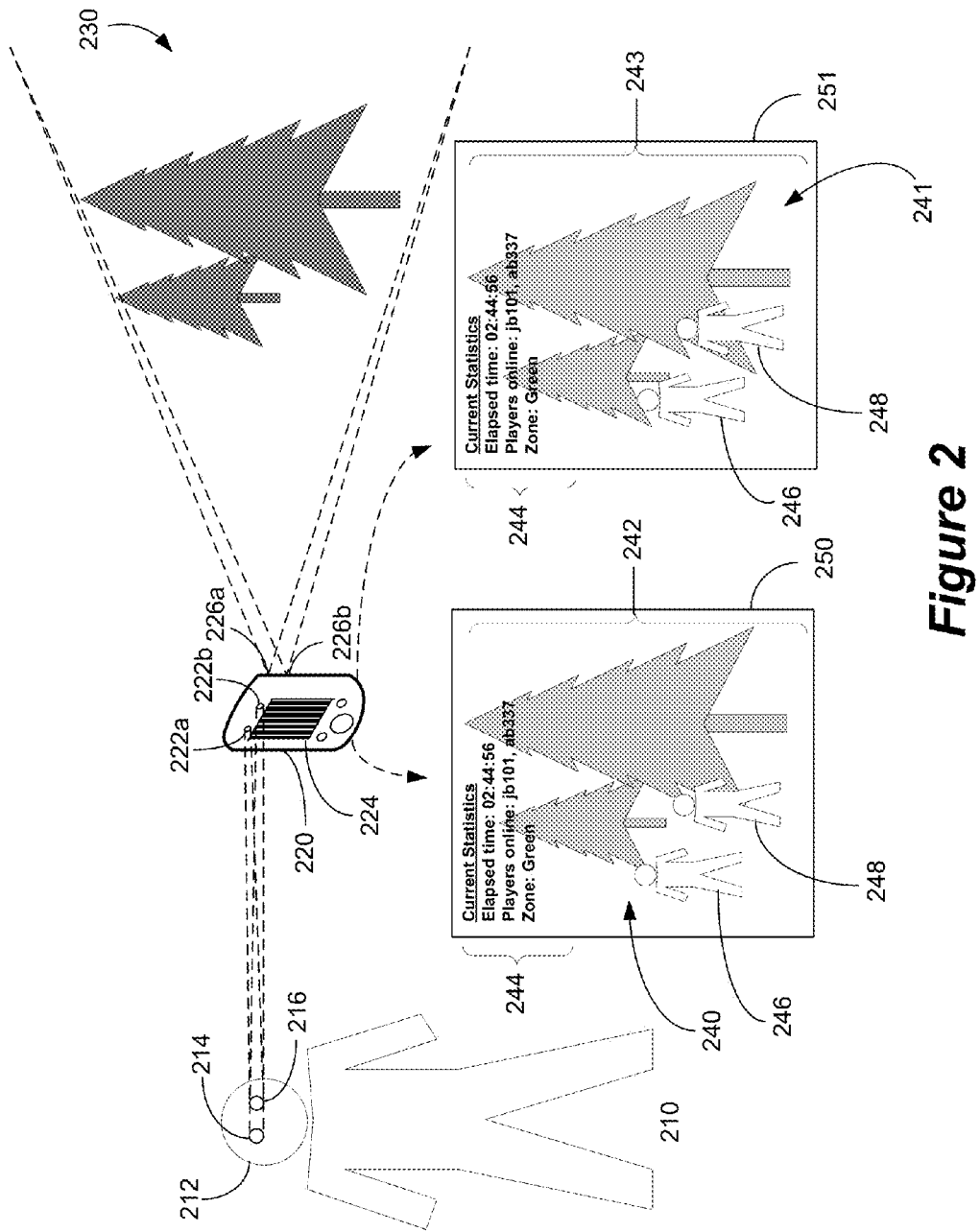
FIG. 2 is a graphical representation of a stereoscopic device in use by a user proximate to a scene.

FIG. 2 illustrates the use of one embodiment of a stereoscopic device. In FIG. 2, user 210 is operating device 220. User 210 may have user's right eye 214 and user's left eye 216. Device 220 may be a device such as device 100 described in FIG. 1, or any other device or combination of devices and/or components capable of implementing one or more aspects of a stereoscopic device or system. Device 220 may be configured with display 224, user-facing detectors 222*a* and 222*b*, and scene-facing detectors 226*a* and 226*b*. Alternatively, device 220 may be configured with more than two, or with one, scene-facing detector and/or user-facing detector. Scene-facing detectors 226*a* and 226*b* may be located on the back of device 220, and are not visible in FIG. 2 due to the positioning of device 220 in the figure. These components may be of any type, quantity, or configuration as described herein in regard to the various figures, or of any other type, quantity, or configuration.

User 210 may be operating device 220 proximate to scene 230. Scene 230 may be any physical space or area that scene-facing detectors 226*a* and/or 226*b* are capable of detecting or from which scene-facing detectors 226*a* and/or 226*b* may otherwise gather data. Device 220 may detect or capture data from scene 230, such as one or more video frames or still images. Device 220 may then process the captured image(s), including cropping and/or adjusting the image according to methods and means set forth herein. As part of the processing of the image, device 220 may augment the captured and/or processed image by overlaying graphics, text, other images, or any other visual data on the captured image, or compositing such data with the captured image, and present the processed image to user 210 by rendering the processed image on display 224.

In one embodiment, where scene-facing detectors 226*a* and 226*b* capture two images, device 220 processes both images and creates two processed images to present to user 210. Alternatively, when only one of scene-facing detectors 226*a* and 226*b* are present or used, device 220 may process one image captured by the single scene-facing detectors 226*a* or 226*b* and present a single processed image to user 210. In another embodiment, device 220 may process one image captured by the single scene-facing detectors 226*a* or 226*b* and create two processed images to present to user 210. In yet another embodiment, a single scene-facing detector, such as detector 226*a* or 226*b*, may capture two images, each of which is then processed by device 220 to create two images to be presented to user 210, one for each of user 210's eyes 214 and 216.

The two processed images 240 and 241 that may be the result of device 220 processing one or more images captured by scene-facing detectors 226*a* and/or 226*b* are illustrated in right display 251 and left display 250. Each of displays 250 and 251 contains an image intended for a particular eye of a user. For example, left display 250 may display left processed image 240 that may be intended for viewing by user's left eye 216, and right display 251 may contain right processed image 241 that may be intended for viewing by user's right eye 214. Processed images 240 and 241 may include scene images 242 and 243 captured by scene-facing detectors 226a and/or 226b. Scene images 242 and 243 may be the same image captured by a single scene-facing detector, different images captured by different scene-facing detectors, different images captured by a single scene-facing detector, or any combination thereof. Processed images 240 and 241 may also contain an image resulting from the cropping, magnification, or other alteration by device 220 of scene images 242 and/or 243 as captured by scene-facing detectors 226a and/or 226b.

Processed images 240 and 241 may also include elements such as persons 246 and 248 that may have been composited with scene images 242 and/or 243 to create processed images 240 and 241. Persons 246 and 248 may be participants in an activity with user 210, such as a game incorporating augmented reality, and may be physically present at an area remote to scene 230. The images of persons 246 and 248 as rendered in processed image 240 may be altered or adjusted by device 220 and/or another device based on the determined location of user 210 and/or a part of user 210 as described herein. Additional information may be added to processed images 240 and 241, such as information 244. Any other information, images, or other data may be added to an image taken by scene-facing detectors 226a and/or 226b. All such information, images, or other data may be generated by device 220, or received at device 220 through one or more means of communications, such as wireless or wired computer network communications.

Processed images 240 and 241 may be cropped, magnified, or otherwise altered in some way based on the position or location of user 210 or some part of user 210, such as user's head 212 or user's eyes 214 and 216, relative to device 220. In one embodiment, user-facing detector 222a detects the location of user's right eye 214 relative to device 220 while user-facing detector 222b detects the location of user's left eye 216 relative to device 220. Device 220 may adjust images 242 and 243 detected by scene-facing detectors 226a and 226b to generate processed images 240 and 241 based on the detected locations of the user's eyes 214 and 216 relative to device 220. In another embodiment, a single user-facing detector, such as detector 222a, detects the location of each of user's eyes 214 and 216 and device 220 uses this information to generate processed images 240 and 241 from a single image captured by a single scene-facing detector such as detector 226a, two images captured by a single scene-facing detector such as detector 226a, two images captured by two detectors such as scene-facing detectors 226a and 226b, or any combination thereof. When a single user-facing detector, such as detector 222a, is used to determine locations of two or more parts of a user relative to a device such as device 220, a single captured image may be used to determine the location or two or more parts of a user, or two or more captured images may be used to determine the location of two or more parts of a user.

The processing performed to generate processed images 240 and 241 may include altering or adjusting one or more images captured by scene-facing detector 226 of scene 230, and/or altering or adjusting one or more images associated with a virtual environment that are composited with one or more scene images. For example, processed images 240 and 241 may include adjusted scene images composited with computer-generated images of a game character and/or an image of a remotely located user participating in an augmented reality application that was transmitted to device 220. The computer-generated images of a game character and/or the images of another user may be adjusted based on the location user's eyes 214 and 216 relative to device 220, or the location of one or more parts of user 210 relative to device 220. Image processing may be performed using any of the means or methods described herein, or any other processing means and methods, and all such embodiments are contemplated as within the scope of the present disclosure.

In an alternative embodiment, device 220 may use one or more images captured by one or more user-facing detectors, such as detectors 222a and 222b, to calculate the location of part(s) of a user relative to device 220 from other located part(s) of a user. For example, device 220 may use an image of user 210 captured by user-facing detector 222a to determine the location of user's head 212 relative to device 220. From the determined location of user's head 212, device 220 may perform calculations that result in an estimated or probable location of user's eyes 214 and/or 216 relative to device 220. Thus, device 220 may use an algorithm or process to determine locations of user part(s) from an actual determined location of the user or other user part(s) derived from an image.

In another embodiment, user 210 may have affixed to the user or a part of the user a device that communicates location and/or position information to device 220. For example, user 210 may be wearing a helmet with communications components capable of transmitting messages to device 220 and components configured to detect or determine user 210's position or location. All such means of determining a user's position or location relative to a device are contemplated, and examples of such means will be discussed in more detail herein.

The location of a user or a part of a user, such as user's head 212 or user's eyes 214 and/or 216, relative to a device may be determined using any effective method. Such methods may include traditional or three-dimensional facial recognition, skin texture analysis, and/or software algorithms designed to detect the position of a user or part(s) of a user from an image or other detected information, including a representation of a user rather than an actual user. Alternatively, a user may have affixed upon the user light-emitting glasses, detectable tags, or other implements that allow the detection of the user or one or more parts of the user. For example, the user may have adhesive dots attached to user's head 212 near user's eyes 214 and 216 that are detectable by a specific type of detector, such as a detector configured to detect a specific form of radiation emitted by the adhesive dots. The detection of these dots may be used to determine the location of user's eyes 214 and 216 relative to device 220. Other methods may be used instead, or in conjunction with, these methods. Any method or means capable of providing data that may be used to determine the location, proximity, or any other characteristic of a user, part(s) of a user, or a user's location or the location of part(s) of a user is contemplated as within the scope of the present disclosure.

Alternatively, the location of a user or parts of a user relative to a device may be determined based on the physical location of one or more displays, such as displays 224, 250, 251, and 110. In one embodiment, a stereoscopic device or system may be implemented in a helmet, headgear, or eyewear. The location of the user's eyes relative to the headgear may be determined by assuming that the user's eyes are proximate to the display(s) that are set into the area in the helmet, headgear, or eyewear that would normally be proximate to the eyes when the helmet, headgear, or eyewear is affixed to or worn by a user. For example, in a stereoscopic device implemented in eyewear with displays set into or proximate to where eyeglass lenses would normally be situated, the device may assume that the user's eyes are just behind the displays. Similarly, in a helmet-implemented system, the system may assume that the user's eyes are proximate to an eye-covering portion of the helmet. Alternatively, the present systems and methods may be used to determine a precise location of a user's eyes, or parts of a user's eyes, such as the iris or pupil, when the user is wearing a stereoscopic headgear, helmet, or eyewear. Such location information may improve the stereoscopic imaging provided to a user. Other configurations and implementations that determine eye locations or the locations of other parts of a user based on the location of a part of the stereoscopic system assumed to be proximate to the user or a part of the user are contemplated as within the scope of the present disclosure.

Figure 3B:
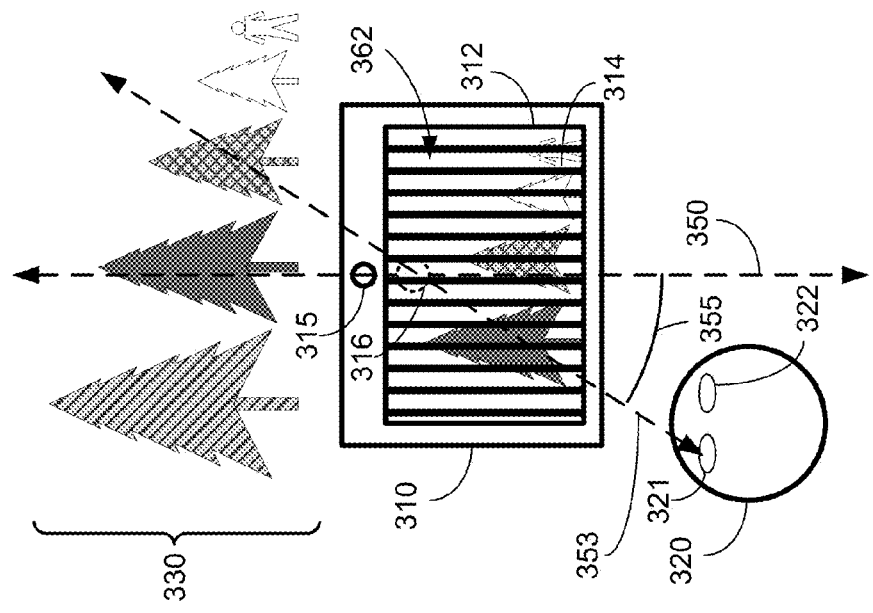
FIG. 3b is another graphical representation demonstrating the image processing that may be performed by a stereoscopic device or system.
Figure 3A:
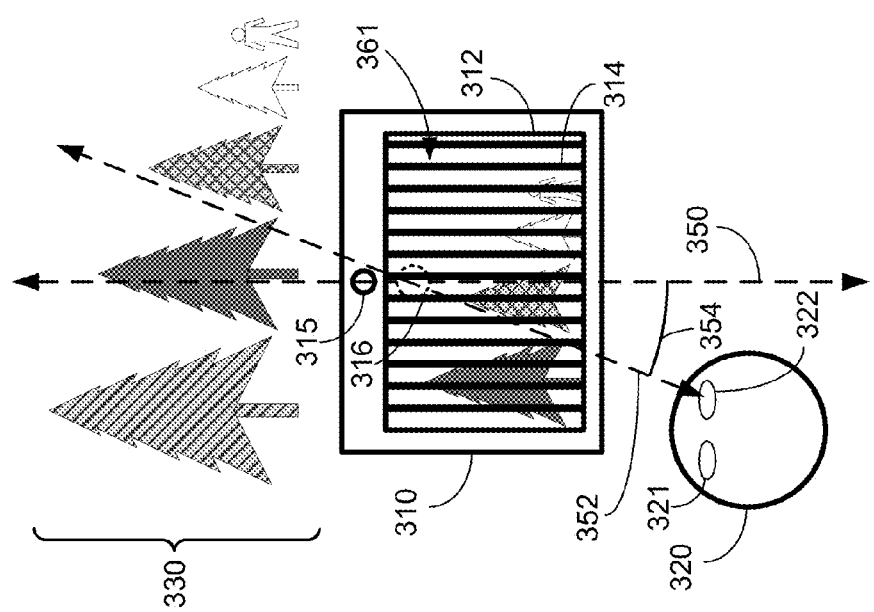
FIG. 3a is a graphical representation demonstrating the image processing that may be performed by a stereoscopic device or system.

FIG. 3a illustrates in more detail the image processing that may be performed by one embodiment of a stereoscopic device or system. User 320 may be operating device 310 that may have incorporated into it, or may be communicatively connected to, user-facing detector 315 and display 312. User 320 may be looking at display 312 with user's eyes 321 and 322. In an alternative embodiment, device 310 may have two or more user-facing detectors and/or two or more displays. Display 312 may be a display configured to display stereoscopic images, and may incorporate components that facilitate the display of stereoscopic images, such as one more lenticular lenses and/or parallax barriers.

Any mechanism or means used with display 312 may be adjustable to facilitate the viewing of one image or a portion of an image by the intended eye. For example, display 312 may have affixed or be configured with mechanism 314. Mechanism 314 may perform the function of a parallax barrier, a lenticular lens or sheet, or other means of obscuring and revealing particular areas of an image displayed on display 312 such that a different area of the displayed image is presented to each eye of a viewer. Mechanism 314 may be mechanically, electrically, or software adjustable so that the appropriate areas of a displayed image are viewable by the appropriate eyes of a user.

Device 310 may also include, or be communicatively connected to, scene-facing detector 316, that may be located on the back of device 310, facing scene 330. Alternatively, scene-facing detector 316 may be in a separate housing from device 310 and may communicate with device 310 using wired or wireless communications means. In an alternative embodiment, device 310 may have two or more scene-facing detectors.

Scene-facing detector 316 may be detecting scene 330. Device 310 and scene 330 may be oriented on an axis 350, while user's right eye 322 may be oriented on axis 352. Alternatively, another part of the user operating device 310, such as user 320's head, may be oriented on an axis 352. In one embodiment, user's right eye 322 is detected at angle 354 to the user's left of axis 350 by user-facing detector 315. Angle 354 may be used to calculate adjustments that are performed on the image or video frame detected by scene-facing detector 316 to create processed image 361 as displayed on display 312. Processed image 361 may be an entire image intended for viewing by the right eye of a user, such as user's right eye 322. Alternatively, processed image 361 may be an image containing two or more areas or sections, with different sections intended to be viewed by different eyes of a user.

Processed image 361 may be a cropped subset of the image captured by scene-facing detector 316. Device 310 may use angle 354, and/or other information about the location and/or position of user's right eye 322 relative to device 310, to determine a crop area and crop area location of the image captured by scene-facing detector 316 so that processed image 361 is presented to the user to create an effect of looking through a window with user's right eye 322 rather than a video or image display. For example, because user's right eye 322 is detected to the left of device 310, processed image 361 may be cropped and a subset of the captured image from an area generally on the right in the image relative to axis 350 may be presented on display 312. Also, because user's right eye 322 is to the user's right of user's left eye 321, image 361 as presented to user's right eye 322 may be cropped and a subset of the captured image that reflects how user's right eye 322 would see scene 330 may be presented on display 312. Alternatively, appropriate sections or areas of processed image 361 may adjusted for presentation to user's right eye 322. Processed image 361 may also be composited with computer-generated or supplemental images that may be adjusted based on angle 354 or other user position information. Methods and means of cropping and adjusting the image will be described in more detail herein.

In one embodiment, instead of, or in addition to, adjusting processed image 361 based on the location of user's right eye 322 relative to device 310, angle 354 may be used to calculate adjustments that are performed to mechanism 314 in order to present one or more particular sections or areas of processed image 361 to a particular eye of a user. For example, device 310 may adjust mechanism 314 so that the sections of processed image 361 that are intended for user's right eye 322 are accessible from the determined location of user's right eye 322.

FIG. 3b illustrates a non-limiting example of image processing that may be performed by an embodiment of a stereoscopic device for user's left eye 321. Here, user's left eye 321 is located to the user's left of axis 350 on axis 353, creating angle 355 between axis 350 and axis 353. Angle 355 may be used to calculate adjustments that are performed on the image or video frame detected by scene-facing detector 316 to create processed image 362 as displayed on display 312. Device 310 may use angle 355, and/or other information about the location and/or position of user's left eye 321 relative to device 310, to determine a crop area and crop area location of the image captured by scene-facing detector 316 so that a subset of the image from an area generally on the right of the image relative to axis 350 is displayed in processed image 365. Also, because user's left eye 321 is to the user's left of user's right eye 322, image 362 as presented to user's left eye 321 may be cropped and a subset of the captured image that reflects how user's left eye 321 would see scene 330 may be presented on display 312. Alternatively, appropriate sections or areas of processed image 362 may adjusted for presentation to user's left eye 321. Processed image 362 may also be composited with computer-generated or supplemental images that may be adjusted based on angle 354 or other user position information. Angle 355 may also be used to adjust mechanism 314 in order to present appropriate sections or areas of processed image 362 to user's left eye 321.

Figures 4A, 4B:
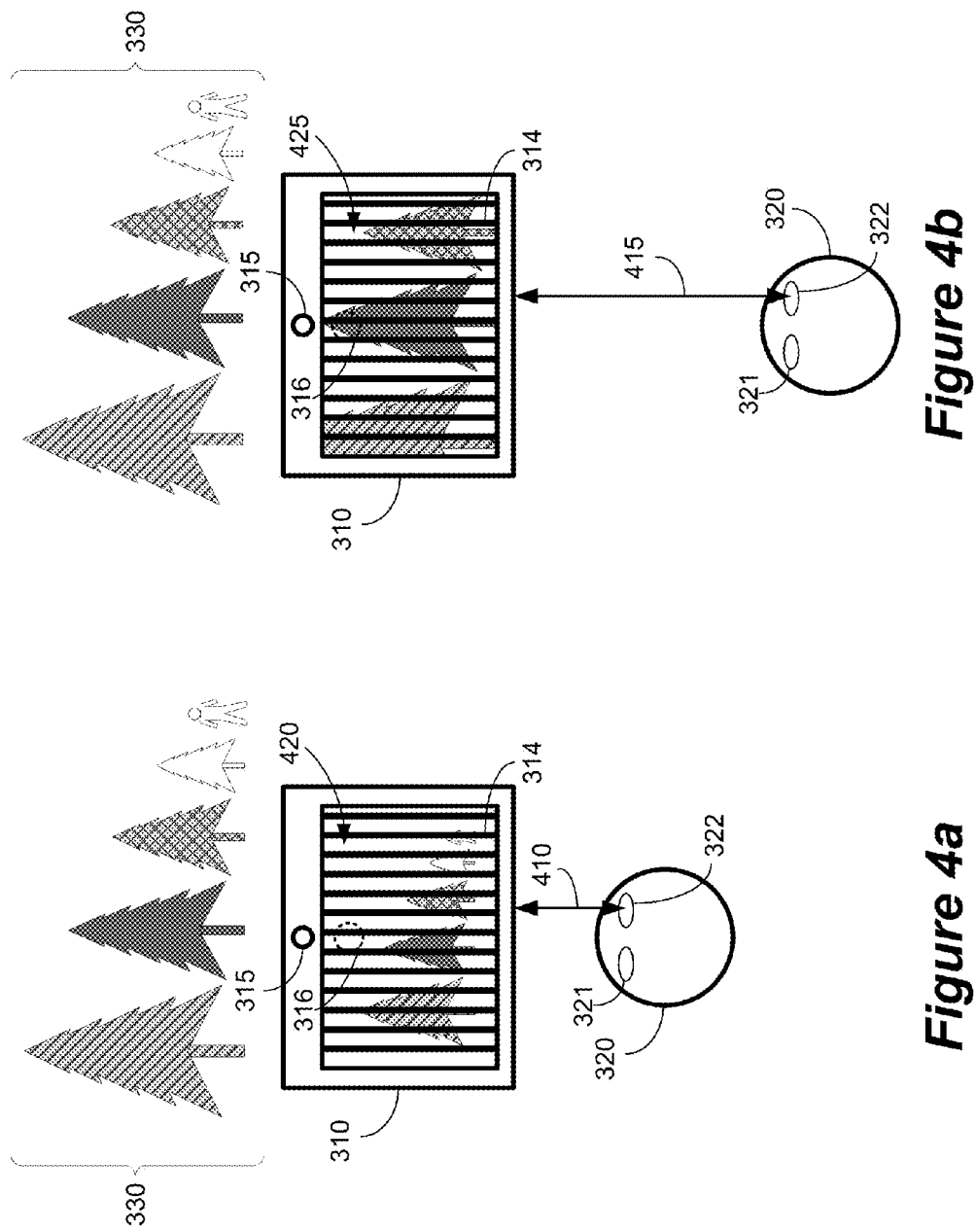
FIG. 4a is another graphical representation demonstrating the image processing that may be performed by a stereoscopic device or system.
FIG. 4b is another graphical representation demonstrating the image processing that may be performed by a stereoscopic device or system.

In another embodiment, the distance between a user or a part of a user and a device may be used to alter the images (scene images, computer-generated images, and/or composited images) presented to the user to implement a lens effect. In FIG. 4a, user's right eye 322 is detected by user-facing detector 315 of device 310 to be distance 410 away from device 310. If device 310 determines that distance 410 is closer to device 310 than a predetermined viewing distance, device 310 may increase the amount of the image collected by scene-facing detector 316 to create processed image 420. This may create the effect of objects appearing to be the same size relative to the location of the user or part of the user. Device 310 may also reduce or otherwise adjust computer-generated or supplemental images associated with a virtual environment to maintain a realistic view of such virtual objects.

Alternatively, as seen in FIG. 4b, if user's right eye 322 is determined to be at a distance 415 that is greater than a predetermined viewing distance, device 310 may magnify or crop and expand a section of the image collected by scene-facing detector 316 that is presented to the user as processed image 425. In one embodiment, such determinations are also performed for user's left eye 321, and a captured image or video frame, or sections of a captured image or video frame, are processed to generate an appropriate image, video frame, or section of an image or video frame for user's left eye 321. Also, device 310 may adjust or otherwise configure mechanism 314 based on the determination of a distance between a user's eye or other part of a user, such as distances 410 and 415. Device 310 may also magnify, enlarge, or otherwise adjust computer-generated or supplemental images associated with a virtual environment to maintain a realistic view of such virtual objects.

Note that any combination of lens effect and image cropping may be used to create a processed image that is presented to a user or a user's eyes. Note also that effects or other manipulations of an image (scene images, computer-generated images, and/or supplemental images) may be performed for purposes of distorting an image presented to a user rather than making an image more realistic for a user. For example, in some embodiments images may be processed resulting in exaggerated perspectives, such as a small change in the position of the user relative to a device results in a large change in the image presented to the user. Alternatively, images may be processed to reflect the opposite or a different perspective than what would be expected. For example, a user may move closer to a device, and the image may be magnified rather than reduced. Such embodiments may be used for entertainment or any other purpose, and all such embodiments are contemplated as within the scope of the present disclosure.

Lens effects and image cropping may be performed based on the determination of any position of location of a user or one or more parts of a user within three-dimensional space relative to a device and/or display. For example, a user may move closer to and to the right of a user-facing detector and/or a display device, resulting in the system shifting left and enlarging a selected region of the captured image. Such an image may also be further adjusted to present an image appropriate for a particular user's eye. Also, detection of the user or parts of the user being higher or lower in altitude relative to an axis may be used to determine a subset presented to the user or a particular eye of a user. For example, a user's right eye may be higher than an axis of the device and/or the scene, and therefore a subset of the image generally located in a lower portion of a captured image may be presented to the user's right eye on a display. Likewise, a user's left eye may be lower than an axis of the device and/or the scene, and therefore a subset of the image generally located in a higher portion of a captured image may be presented to the user's left eye on a display. Adjustments of a stereoscopic mechanism, such as mechanism 314, may also be made based on the detection of a location of a user's eyes relative to a device and/or display, other parts or a user, or the user as a whole.

Alterations may also be performed on images presented to a user that are part of the virtual environment of an augmented reality application or system. Computer-generated images or images of actual users and/or objects that are not physically in the space captured by a scene-facing detector may be rendered using user location or position information so that such images appear correct in perspective and more realistic to the user. As with images captured by a scene-facing detector, computer-generated images may be adjusted in any dimension based on the location or position of the user relative to a device or detector using any of the methods or means described herein. Any combination of image alterations and any means and methods used to accomplish them are contemplated as within the scope of the present disclosure. Any combination of these image alterations and mechanism adjustments, and any means and methods used to accomplish them, are contemplated as within the scope of the present disclosure.

In some embodiments, such image alterations are performed continuously. For example, when used in video applications, image alterations may be performed on each video frame and altered images presented to a user in real, or near real, time, thus enabling a truly interactive experience. Images may be altered in other ways as well, including augmenting images to include graphics, other video images, and any other information or data that may be desired. For example, images altered by the presently disclosed stereoscopic device or system may be used in an augmented reality application.

In other embodiments, a single image may be used to calculate a position or location of both of the user's eyes relative to a display and/or device individually. For example, user-facing detector 315 may capture a single image and determine the location of user's left eye 321 and user's right eye 322 relative to device 310 from the single image. Alternatively, user-facing detector 315 may capture a first image and determine the location of user's left eye 321 relative to device 310 from the first image, and then capture a second image and determine the location of user's right eye 322 relative to device 310 from the second image. In yet another alternative, device 310 may be configured with two or more user-facing detectors, and one or more of the user-facing detectors may be dedicated to capturing images to be used for the determination of a location of a single eye relative to a display and/or device, such as user's left eye 321 or user's right eye 322.

Similarly, a single image may be used to generate a first processed image for user's right eye 322 and a second processed image for user's left eye 321. For example, scene-facing detector 316 may capture one image that is processed to generate a first image for user's left eye 321 based on a determination of the location of user's left eye 321 (regardless of how such a determination is made) and a second image for user's right eye 322 based on a determination of the location of presented to user's right eye 322 (regardless of how such a determination is made.) Alternatively, device 310 may be configured with two or more scene-facing detectors, and one or more of the scene-facing detectors may be dedicated to capturing images to be used for the generation of images for viewing by a single eye, such as user's left eye 321 or user's right eye 322. In yet another alternative, device 310 may have a single scene-facing detector, such as scene-facing detector 316, that may be configured to capture a first image to be processed and used to generate a first processed image for user's left eye 321, and a second image to be processed and used to generate a second processed image for user's right eye 322. All such means and methods of determining eye or other user part(s) locations or positions and all such means and methods of capturing images for such determination and for generation of processed images for presentation to a user or a part of a user, and all combinations thereof, are contemplated as within the scope of the present disclosure.

Figure 5:
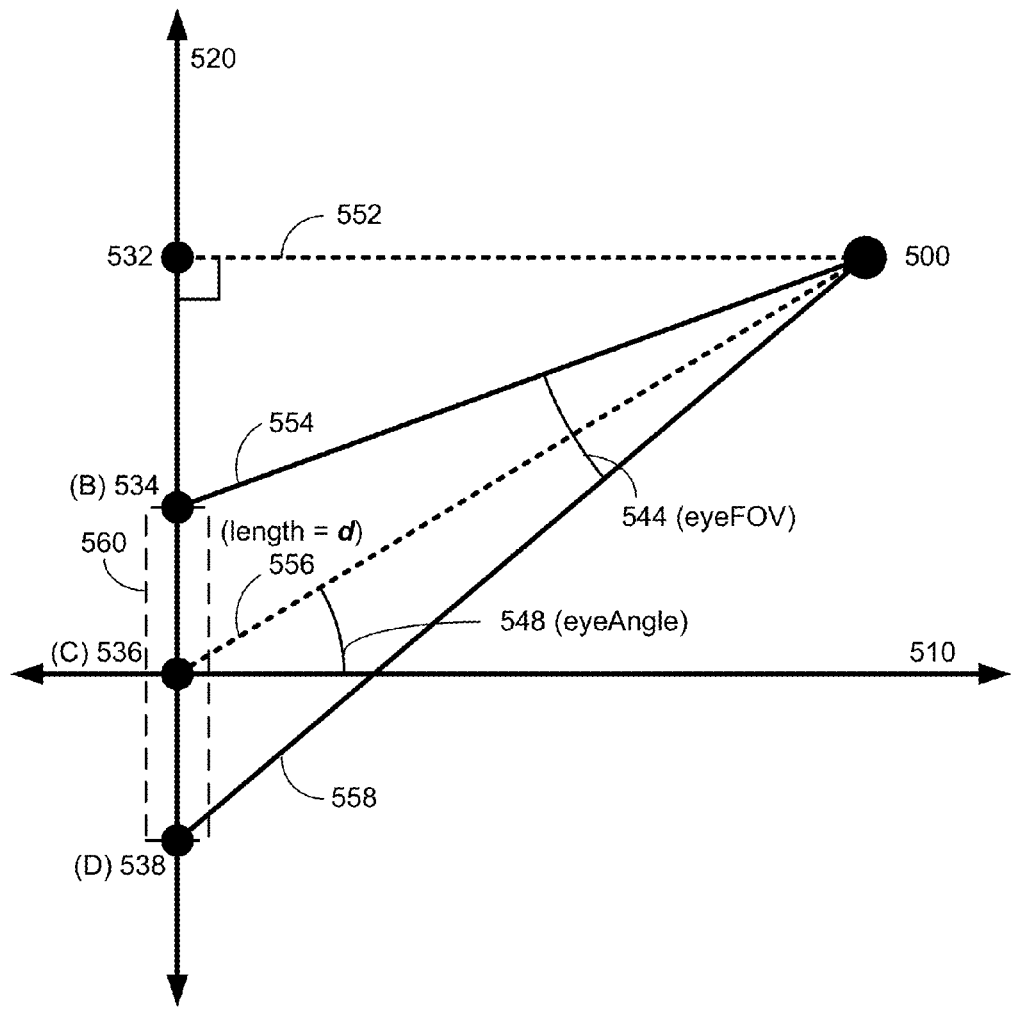
FIG. 5 is a non-limiting exemplary representation of the locations of the various elements that may be present in, or interact with, a stereoscopic device or system and their relative geometry.

FIG. 5 is a non-limiting, exemplary graphical representation of the locations of the various elements that may be present in a stereoscopic device or system and their relative geometry. In FIG. 5, representations of elements of the system and their geometric relationships are set forth on a rectangular coordinate system with x axis 510 and y axis 520 representing a single plane in the three-dimensional space in which a stereoscopic device or system may be implemented and/or operated. The plane represented may be the horizontal plane, the vertical plane, or any plane in three-dimensional space. A user or part of a user, such as a user's right eye, may be located at user point 500. The user may be operating a device embodying the presently disclosed device or system, in whole or in part, that may have display 560 with center point 536 that occupies the area between points 534 and 538 in the represented plane.

Line 552 may run perpendicular toy axis 520, intersecting y axis 520 at point 532. Line 554 may run from user point 500 to the right edge (from the perspective of user point 500) of display 560, intersecting y axis 520 at point 534 ('B' in the equations to follow). Alternatively, point 534 may be the top edge, bottom edge, or left edge of display 560. Line 558 may run from user point 500 to the left edge (from the perspective of user point 500) of display 560, intersecting y axis 520 at point 538 ('D' in the equations to follow). Alternatively, point 534 may be the top edge, bottom edge, or right edge of display 560. Line 556 may run from user point 500 to the center of display 560, intersecting y axis 520 at point 536 ('C' as used equations to follow). The distance from edge of display 560 at point 534 to the center of display 560 at point 536 may be distance BC, and the distance from edge of display 560 at point 538 to the center of display 560 at point 536 may be distance CD.

Angle 544 may be the angle created by lines 554 and 558, which may represent the field of view (eyeFOV) from a user's eye (or other part of a user, such as user's head, for example) represented by user point 500. Angle 548 may be the angle between line 556 and x axis 510 (eyeAngle). Line 556 may have a length d that represents the distance from user point 500 to the center of display 560 at point 536. In one embodiment, eyeFOV may be useful in determining the section of an image or video frame to display to a user's eye on a display that is part of a stereoscopic device or system, as will be set forth in more detail below. In another embodiment, eyeFOV may be useful in determining an adjustment or configuration of a stereoscopic mechanism or component, such as a parallax barrier, a lenticular lens, and/or a lenticular sheet. In some embodiments, an eyeFOV value may be determined for both the vertical and horizontal planes. In other embodiments, an eyeFOV may be determined for both a user's left eye and a user's right eye.

In order to obtain the eyeFOV, in one embodiment, the following equation may be used:

Note that in the equation shown above, as well as those to follow, multipliers may be used, or variables or other elements of the equations may be altered in order to obtain varying results. When the equations are used as shown, the change in perspective of a user or a part of user that is obtained matches a 1-to-1 change in the location or position of the user or part of a user. Alternatively, by manipulating the equations shown, and/or by using multipliers, the perspective obtained may not be a 1-to-1 correspondence to the change in the location or position of the user or part of a user. For example, a large change in the location or position of a user or a part of a user may result in only a small change in calculated perspective, or, in another embodiment, a small change in the location or position of a user or a part of a user may result in a large change in calculated perspective. All such embodiments are contemplated as within the scope of the present disclosure.

In some embodiments, further processing or calculations may be performed prior to or in addition to the calculations described herein. For example, methods and means of correcting for lens distortion and perspective distortion may be performed. Any type of lens or perspective distortion may be corrected for at any point when performing the methods described herein. Such correction may take the form of image warping, distortion compensation, or any other means of method. Such correction may be performed on scene images and/or user images. In one embodiment, lens and/or perspective distortion correction is performed on one or more scene images before further calculations as described herein are performed in order to render a more accurate dynamic perspective image. All methods and means of correcting for any type of distortion are contemplated as within the scope of the present disclosure.

Figure 6:
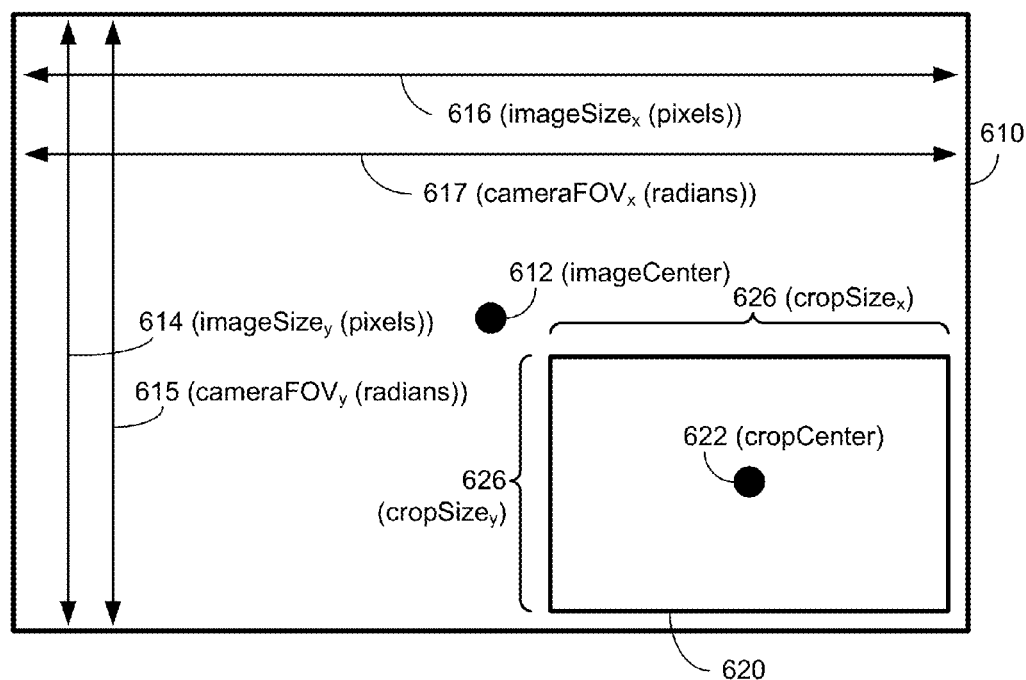
FIG. 6 is a non-limiting exemplary representation of the dimensions of images that may be detected and processed by a stereoscopic device or system.

In some embodiments, the image or video frame presented to an eye of a user or a user in a stereoscopic device or system may be an image containing a subset of an image captured by a scene-facing detector or camera. FIG. 6 shows one exemplary, non-limiting representation of how an image captured by a scene-facing camera may be cropped to create an image presented to a user's eye. Scene image 610 represents an image captured by a scene-facing camera or detector. User image 620 represents an image presented to a user's eye that may be a subset of scene image 610. The center of scene image 610 is represented by scene image center point 612 (imageCenter). The center of user image 620 is represented by user image center point 622 (cropCenter).

Scene image 610 may be measured in radians (or any other unit) of the scene-facing detector's field of view (cameraFOV) and pixels of the scene image (imageSize). In one embodiment, these measurements can be used in conjunction with values determined using the equation shown above to determine the crop size and location of user image 620. First, a value of pixels per radian for each dimension may be determined using the scene-facing detector's field of view (cameraFOV) and pixels of the scene image (imageSize) using the following equation. Note that in the following equations, the subscript "xy" is used to indicate that the equations may be used to calculate values in either the x or the y dimension:

$$eyeFOV = \arctan\left(\frac{d\sin(eyeAngle) + |CD|}{d\cos(eyeAngle)}\right) - \arctan\left(\frac{d\sin(eyeAngle) - |BC|}{d\cos(eyeAngle)}\right)$$

$$pixelsPerRadian_{xy} = \frac{imageSize_{xy}}{cameraFOV_{xy}}$$

Next, the size of user image 620 in pixels may be determined for each dimension using the following equation:

$$cropSize_{xy} = eyeFOV_{xy} * pixelsPerRadian_{xy}$$

Finally, after determining the size of user image 620 in pixels, user image center point 622 (cropCenter) may be determined so that the appropriate subset of scene image 610 may be cropped from scene image 610 to create user image 620 for presentation to a particular eye of a user. The follow equation may be used to determine user image center point 622 (cropCenter):

$$cropCenter_{xy} = imageCenter_{xy} - (eyeAngle_{xy} * pixelsPerRadian_{xy})$$

Once user image center point 622 and the size of user image 620 in pixels is determined, scene image 610 can be cropped in the determined area creating user image 620. This may create an image that can be presented to a user that shows an image resembling what a user would see through a particular eye if the user were looking at the scene through a window located at the point where the display on which the user image 620 is presented is located. Note that in the equations shown above multipliers may be used, or variables or other elements of the equations may be altered, in order to obtain varying results. Other processing may be performed on user image 620 before it is presented to the user, including augmenting user image 620 with additional video, graphics, text, or any other data or information that may be desired. This additional visual data may also be adjusted based on the results of any of the calculations performed as described herein and/or on the relative location of a user or a part of a user. Other means and methods of determining the size, location, and other alterations of user image 620 may be used, and all such means and methods are contemplated as within the scope of the present disclosure.

Figure 7:
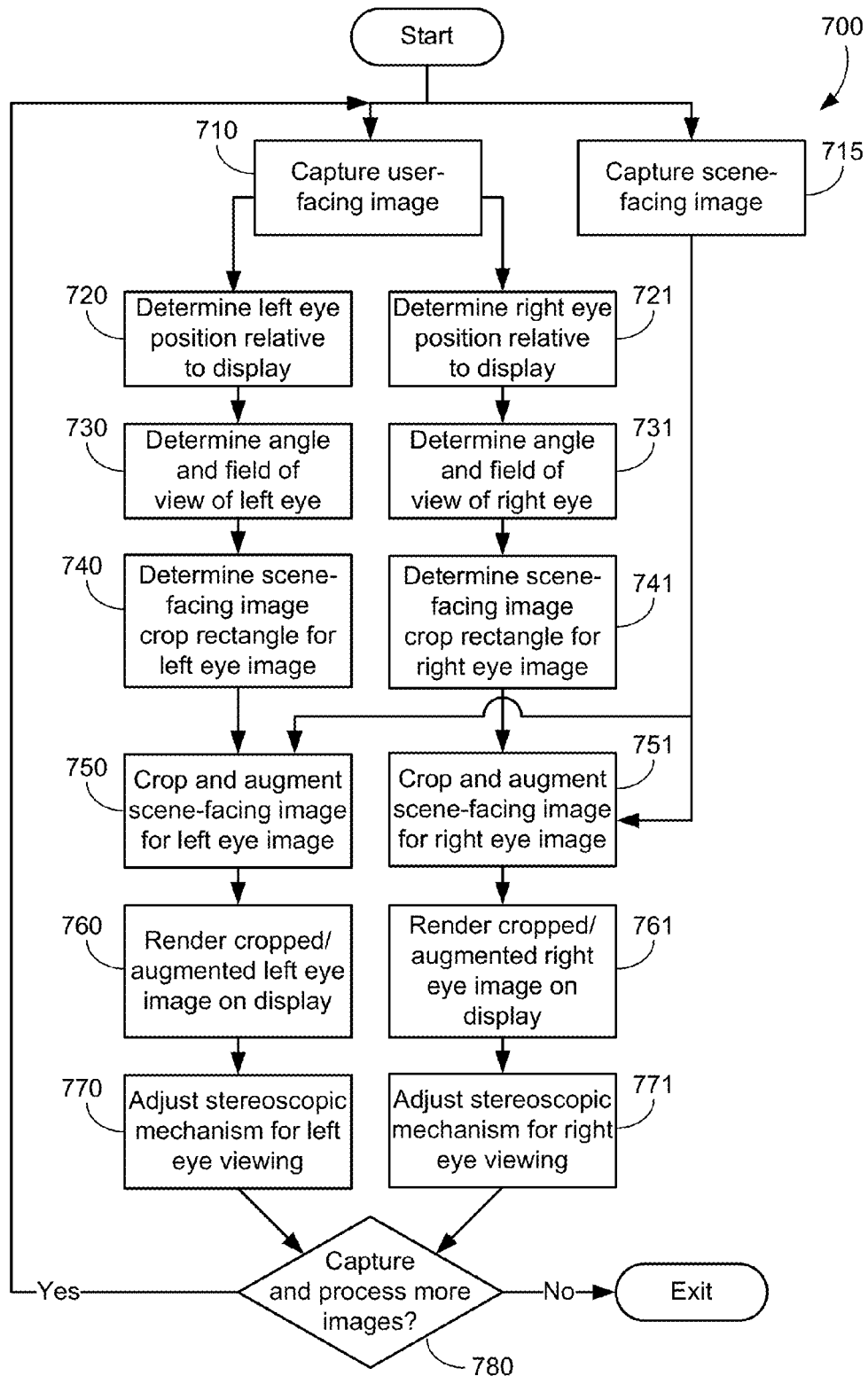
FIG. 7 is a non-limiting exemplary diagram of a method of implementing a stereoscopic device or system.

FIG. 7 illustrates a non-limiting exemplary method 700 for implementing a stereoscopic device or system. At block 710, a user-facing image is captured using a user-facing camera or detector of any type disclosed herein, or any other type of camera or detector capable of capturing data related to a user. Alternatively, two or more user-facing images may be captured. For example, a stereoscopic device may be configured with two or more user-facing detectors, and may capture two or more user-facing images with multiple detectors. Each user-facing image may be intended for use in determining the position of each eye. In another embodiment, one user-facing detector may capture two or more user-facing images, with each of the two or more user-facing images intended for use in determining the location or position of a single eye. In such embodiments, the user-facing images may be captures in rapid succession so as to capture the position or location of, for example, each user's eye in close temporal proximity. All such embodiments, and variations and/or combinations thereof, are contemplated as within the scope of the present disclosure.

At block 715, a scene-facing image is captured using a scene-facing camera or detector of any type disclosed herein, or any other type of camera or detector capable of capturing data related to a scene. Alternatively, two or more scene-facing cameras or detectors may capture two or more scene-facing images. Each of the captured scene-facing images may be intended to be processed into an image to be presented to a particular user's eye. In another embodiment, two or more scene-facing images may be captured by a single scene-facing detector, with each captured scene-facing image intended to be processed into an image to be presented to a particular user's eye. In such embodiments, the scene-facing images may be captures in rapid succession so as to capture images of the detected space or area that are close in temporal proximity. All such embodiments, and variations and/or combinations thereof, are contemplated as within the scope of the present disclosure.

The images captured at blocks 710 and 715 may be captured simultaneously so that the images are temporally synchronized and the one or more processed images that are presented to the user represent an accurate real-time view. In other embodiments, the images captured at blocks 710 and 715 may not be captured simultaneously. All such embodiments are contemplated as within the scope of the present disclosure.

At block 720, a position or a location of a user's left eye relative to the display is determined. This may be accomplished using any of the methods and means disclosed herein, or by using any other effective means of determine the position of a user's eye. Alternatively, the position or location of another part of the user, such as the user's head, or the user's entire body, may be determined, in one embodiment, using the means and methods set forth herein. The determined position may be the three-dimensional position of the user's left eye (or other part of the user, or the user as a whole), including a distance or angle in the horizontal and/or vertical planes relative to the display, as well as a distance from the display. Alternatively, a subset of the possible position measurements of the user's position may be used.

In some embodiments, a specific part or parts of a user will be detected and measured for position relative to a display and/or device, such as a user's head, eyes, or torso. Alternatively, the entire user may be measured for position relative to a display and/or device from the user-facing image. In such embodiments, the location or position of the user's left eye relative to a display and/or device may be determined by using estimates, averages, algorithms, or any other means based on the determined location of the user's body or part of the user's body such as the head. For example, the position or location of the user's head may be determined at block 720. An algorithm may then be used to determine the location of the eyes based on the knowledge that the average person's eyes are vertically in the middle of the head and 2.5 inches apart. Using such an algorithm (which is exemplary and not intended to be limiting), it may be determined that the user's left eye is 1.75 inches to the user-facing detector's right on the horizontal center of the user's head. Any other means and methods of extrapolating the location of a user's eye are contemplated as within the scope of the present disclosure.

In other embodiments, a representation of the user or a part or parts of the user may be measured for position. For example, a user may have affixed upon the user's head one or more detectable stickers, patches, or other indicator(s) composed of detectable material that are then detected by the user-facing detector. Alternatively, a user may be wearing glasses or other headgear that are detectable by a user-facing detector. In yet another embodiment, a user may be operating a device or other mechanism that serves as a proxy for the user, such as a robot or remote-controlled device. This remote-controlled device may be detected and measured for position at block 710. All such embodiments are contemplated as within the scope of the present disclosure.

At block 721, the same determination is performed for the user's right eye, and all embodiments contemplated for determining the location of the user's left eye are contemplated for determining the location of the user's right eye.

At block 730, an angle and field of view of user's left eye may be determined. At block 731, an angle and field of view of user's right eye may be determined. These determinations may be performed using the means described herein for determining these values, or alternate means may be used.

Using the determined angle and field of view values for each eye, at blocks 740 and 741 the scene-facing image crop rectangle for the user's left and right eye, respectively, may be determined. Such a determination may include determining both the location and the dimensions of a crop rectangle for each eye in relation to the scene-facing image. This crop rectangle may be determined using the means described herein for determining the subset of a scene-facing image to use for a user image, or alternate means may be used. All such embodiments are contemplated as within the scope of the present disclosure.

At blocks 750 and 751, the scene-facing image or images captured at block 715 may be cropped using the crop rectangles determined at blocks 740 and 741 for each eye. Also at blocks 750 and 751, the cropped images for each eye may be augmented with additional data, images, graphics, or other information as desired, for example when the resulting images are to be used in an augmented reality application. In another embodiment, additional data, images, etc. are added to or composited with the scene-facing image or images before the scene-facing image or images are cropped. Regardless of when additional data is composited with the scene-facing image, such additional data may also be adjusted or modified at blocks 750 and 751 based on the location of the user as determined and/or the calculations performed at blocks 720, 721, 730, 731, 740, and 741. Alternatively, no additional data or information may be added to the cropped images. In yet another embodiment, no cropping may be performed, and additional data, images, graphics, or other information may be added to the scene-facing images as part of the processing to generate user images for each eye.

At block 760, the augmented and/or cropped image intended for viewing by the user's left eye is rendered on a display using any effective means or methods. At block 761, the augmented and/or cropped image intended for viewing by the user's right eye is rendered on a display using any effective means or methods. It is contemplated that separate images may be displayed to each of the user's eye using separate displays or by rapidly alternating the separate images on a single display. Alternatively, different section or areas of a single image may be generated at the blocks described in the method shown in FIG. 7, and the total image may be presented to a user on a display using stereoscopic technology (for example, parallax barriers or lenticular screens/sheets) that facilitates the display of particular sections of an image to one particular eye of a user. It is also contemplated that a user may employ additional means, such as shutter glasses, to view the images presented in some embodiments. Any other variations on these means or methods, and all other methods and means of displaying an image or video, stereoscopic or otherwise, are contemplated as within the scope of the present disclosure.

At block 770, one or more stereoscopic mechanisms may be adjusted based on the determined position of the left eye. Likewise, at block 771, one or more stereoscopic mechanisms may be adjusted based on the determined position of the right eye. Such adjustments may be electrically, mechanical, chemical, or software implemented, and may be performed independently for each eye or a single adjustment may be implemented taking into account the location of both eyes. For example, a parallax barrier may be physically shifted in any dimension based on the location of the user's left and right eyes so that the stereoscopic effects of the displayed image may be optimized for the user. Any other adjustments or configurations of a stereoscopic mechanism that may be implemented based on the location of a user's eye, body, or other part of a user or representation of a user or part of a user are contemplated.

Note that the actions performed at blocks 770 and 771 may not be performed in every embodiment of the present disclosure. Also, the actions performed at the blocks of method 700 may be performed in any sequence. For example, adjustments of stereoscopic mechanism(s) may be performed immediately following the determination of the location of one or both of the user's eyes (or any other part of the user), and the image processing may be performed thereafter. Alternatively, such actions may be performed in a different order or simultaneously. All such embodiments are contemplated as within the scope of the present disclosure.

At block 780, a determination is made as to whether additional images or video frames are to be captured and processed. If not, for example where one user-facing image or video frame and one scene-facing image or video frame were captured, the method is complete. Alternatively, in one embodiment, the method returns to blocks 710 and 715 to repeat the process, for example, to render ongoing video images.

The methods and systems described herein may be implemented on one or more devices, components, or systems that are currently available or may be developed. Such devices, components, and systems may be designed or configured to implement parts of or a complete stereoscopic device or system, and/or may be used for additional tasks or functions as well as implementing parts of or a complete stereoscopic device or system. Non-limiting exemplary devices, components, and systems that may be used in implementing a stereoscopic device or system, in whole or in part, are described in further detail below.

Exemplary Networked and Distributed Environments

One of ordinary skill in the art can appreciate that a computer or gaming console, or other client or server device, including handheld communications devices, mobile telephones, personal data assistants (PDAs), or any other device with computing and communications capabilities, can be deployed as part of a computer network, or in a distributed computing environment. In this regard, the present disclosure pertains to any stereoscopic device or system, computer system, or virtual or augmented reality environment system as described herein, having any number of memory or storage units, and any number of applications and processes occurring across any number of storage units or volumes, which may be used in connection with a stereoscopic device or system. The present disclosure may apply to an environment with server computers and client computers deployed in a network environment or distributed computing environment having remote or local storage. The present disclosure may also be applied to standalone computing devices, having programming language functionality, interpretation and execution capabilities for generating, receiving and transmitting information in connection with one or more stereoscopic devices or systems.

Distributed computing facilities may share computer resources and services by direct exchange between computing devices and systems, such as transmission of a captured user-facing or scene-facing images by a detector or camera to a computing device configured to communicate with several detectors or cameras. These resources and services include the exchange of information, cache storage, and disk storage for files. Distributed computing takes advantage of network connectivity, allowing clients to leverage their collective power to create and participate in sophisticated virtual environments. In this regard, a variety of devices may have applications, objects or resources that may implicate a stereoscopic device or system that may utilize the techniques of the present subject matter.

Figure 8:
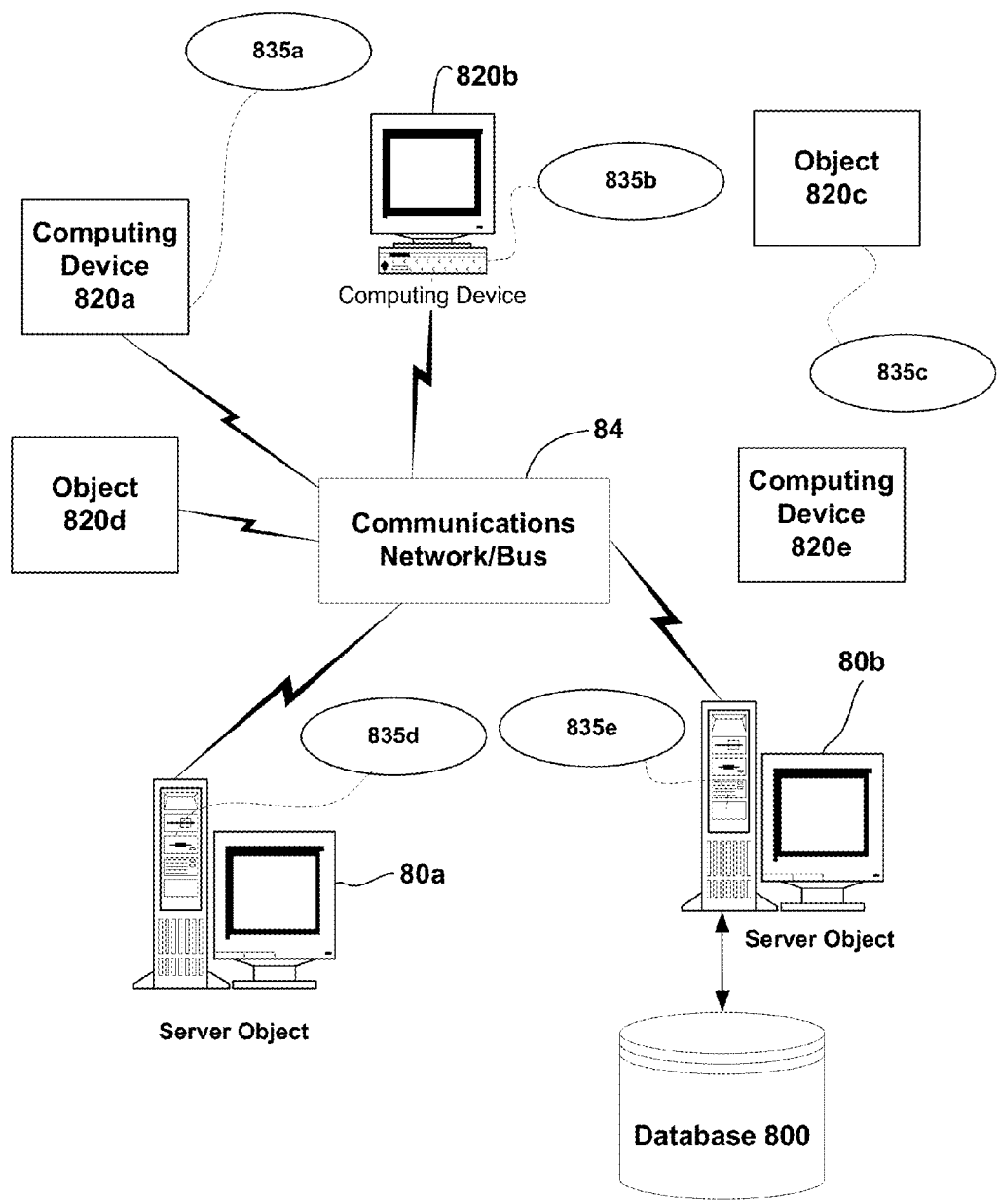
FIG. 8 is a block diagram representing an exemplary network environment having a variety of computing devices in which the present disclosure or parts thereof may be implemented.

FIG. 8 provides a schematic diagram of an exemplary networked or distributed system in which one or more stereoscopic devices or systems may be implemented, in some embodiments as part of a virtual or augmented reality environment system. The distributed system comprises server computing objects 80*a*, 80*b*, etc. and computing objects or devices 820*a*, 820*b*, 820*c*, etc. These objects may be personal computers, gaming consoles, portable devices, mobile communications devices, digital or analog cameras, other forms of detectors, or any other computing device. These objects may comprise programs, methods, data stores, programmable logic, etc. The objects may comprise portions of the same or different devices such as personal digital assistants (PDAs), televisions, Moving Picture Experts Group (MPEG-1) Audio Layer-3 (MP3) players, televisions, personal computers, etc. Each object can communicate with another object by way of the communications network 84. This network may itself comprise other computing objects and computing devices that provide services to the system of FIG. 8. This network may include wired and/or wireless components. In accordance with an aspect of the present disclosure, each object 80*a*, 80*b*, etc. or 820*a*, 820*b*, 820*c*, etc. may contain an application that might function as a component or element of a stereoscopic device or system.

In a distributed computing architecture, computers, which may have traditionally been used solely as clients, may communicate directly among themselves and may act as both clients and servers, assuming whatever role is most efficient for the network or the virtual or augmented reality environment system. This reduces the load on servers and allows all of the clients to access resources available on other clients, thereby increasing the capability and efficiency of the entire network. A virtual or augmented reality environment system or a stereoscopic device or system in accordance with the present disclosure may thus be distributed among servers and clients, acting in a way that is efficient for the entire system.

Distributed computing can help users of stereoscopic devices or systems interact and participate in a virtual or augmented reality environment across diverse geographic boundaries. Moreover, distributed computing can move data closer to the point where data is consumed acting as a network caching mechanism. Distributed computing also allows computing networks to dynamically work together using intelligent agents. Agents reside on peer computers and communicate various kinds of information back and forth. Agents may also initiate tasks on behalf of other peer systems. For instance, intelligent agents can be used to prioritize tasks on a network, change traffic flow, search for files locally, or determine anomalous behavior such as a virus and stop it before it affects the network. All sorts of other services may be contemplated as well. Since a virtual or augmented reality environment system may in practice be physically located in one or more locations, the ability to distribute information and data associated with a virtual or augmented reality environment system is of great utility in such a system.

It can also be appreciated that an object, such as 820*c*, may be hosted on another computing device 80*a*, 80*b*, etc. or 820*a*, 820*b*, etc. Thus, although the physical environment depicted may show the connected devices as computers, such illustration is merely exemplary and the physical environment may alternatively be depicted or described comprising various digital devices such as gaming consoles, PDAs, televisions, mobile telephones, cameras, detectors, etc., software objects such as interfaces, COM objects and the like.

There are a variety of systems, components, and network configurations that may support stereoscopic devices or systems. For example, computing systems and detectors or cameras may be connected together by wired or wireless systems, by local networks, or by widely distributed networks. Currently, many networks are coupled to the Internet, which provides the infrastructure for widely distributed computing and encompasses many different networks.

The Internet commonly refers to the collection of networks and gateways that utilize the Transport Control Protocol/Interface Program (TCP/IP) suite of protocols, which are well-known in the art of computer networking. The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 8, computers 820*a*, 820*b*, etc. can be thought of as clients and computers 80*a*, 80*b*, etc. can be thought of as the server where server 80*a*, 80*b*, etc. maintains the data that is then replicated in the client computers 820*a*, 820*b*, etc.

A server is typically a remote computer system accessible over a local network such as a LAN or a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a URL address. For example, communication can be provided over a communications medium. In particular, the client and server may be coupled to one another via TCP/IP connections for high-capacity communication.

Thus, FIG. 8 illustrates an exemplary networked or distributed environment, with a server in communication with client computers via a network/bus, in which the present disclosure may be employed. In more detail, a number of servers 80*a*, 80*b*, etc., are interconnected via a communications network/bus 84, which may be a LAN, WAN, intranet, the Internet, etc., with a number of client or remote computing devices 820*a*, 820*b*, 820*c*, 820*d*, 820*e*, etc., such as a portable computer, handheld computer, thin client, networked appliance, mobile telephone, personal computer, gaming console, camera, detector, or other device, in accordance with the present disclosure. It is thus contemplated that the present disclosure may apply to any computing device that may communicate, interact, and/or operate in or with a stereoscopic device or system.

In a network environment in which the communications network/bus 84 is the Internet, for example, the servers 80*a*, 50*b*, etc. can be web servers with which the clients 820*a*, 820*b*, 820*c*, 820*d*, 820*e*, etc. communicate via any of a number of known protocols such as HTTP. Servers 80*a*, 80*b*, etc. may also serve as clients 820*a*, 820*b*, 820*c*, 820*d*, 820*e*, etc., as may be characteristic of a distributed virtual environment or a distributed stereoscopic system. Communications may be wired or wireless, where appropriate. Client devices 820*a*, 820*b*, 820*c*, 820*d*, 820*e*, etc. may or may not communicate via communications network/bus 84, and may have independent communications associated therewith. Each client computer 820*a*, 820*b*, 820*c*, 820*d*, 820*e*, etc. and server computer 80*a*, 80*b*, etc. may be equipped with various application program modules or objects 835*a*, 835*b*, 835*c*, 835*d*, 835*e*, etc. and with connections or access to various types of storage elements or objects, across which files, images, or frames may be stored or to which portion(s) of files, images, or frames may be downloaded or migrated. Any computers 80*a*, 80*b*, 820*a*, 820*b*, 820*c*, 820*d*, 820*e*, etc. may be responsible for the maintenance and updating of database 800 or other storage element in accordance with the present subject matter, such as a database or memory 800 for storing stereoscopic system data, such as captured, augmented, and/or modified files, images, and/or frames. Database 800 and one or more of computers 80*a*, 80*b*, 820*a*, 820*b*, 820*c*, 820*d*, 820*e*, etc., may form elements of a stereoscopic device or system as described herein and may interact with other components or elements of a stereoscopic device or system according to the present disclosure. Thus, the present disclosure can be utilized in a computer network environment having client computers 820*a*, 820*b*, 820*c*, 820*d*, 820*e*, etc. that can access and interact with a computer network/bus 84 and server computers 80*a*, 80*b*, etc. that may interact with client computers 820*a*, 820*b*, 820*c*, 820*d*, 820*e*, etc. and other like devices, and databases 800.

Exemplary Computing Environment

Figure 9:
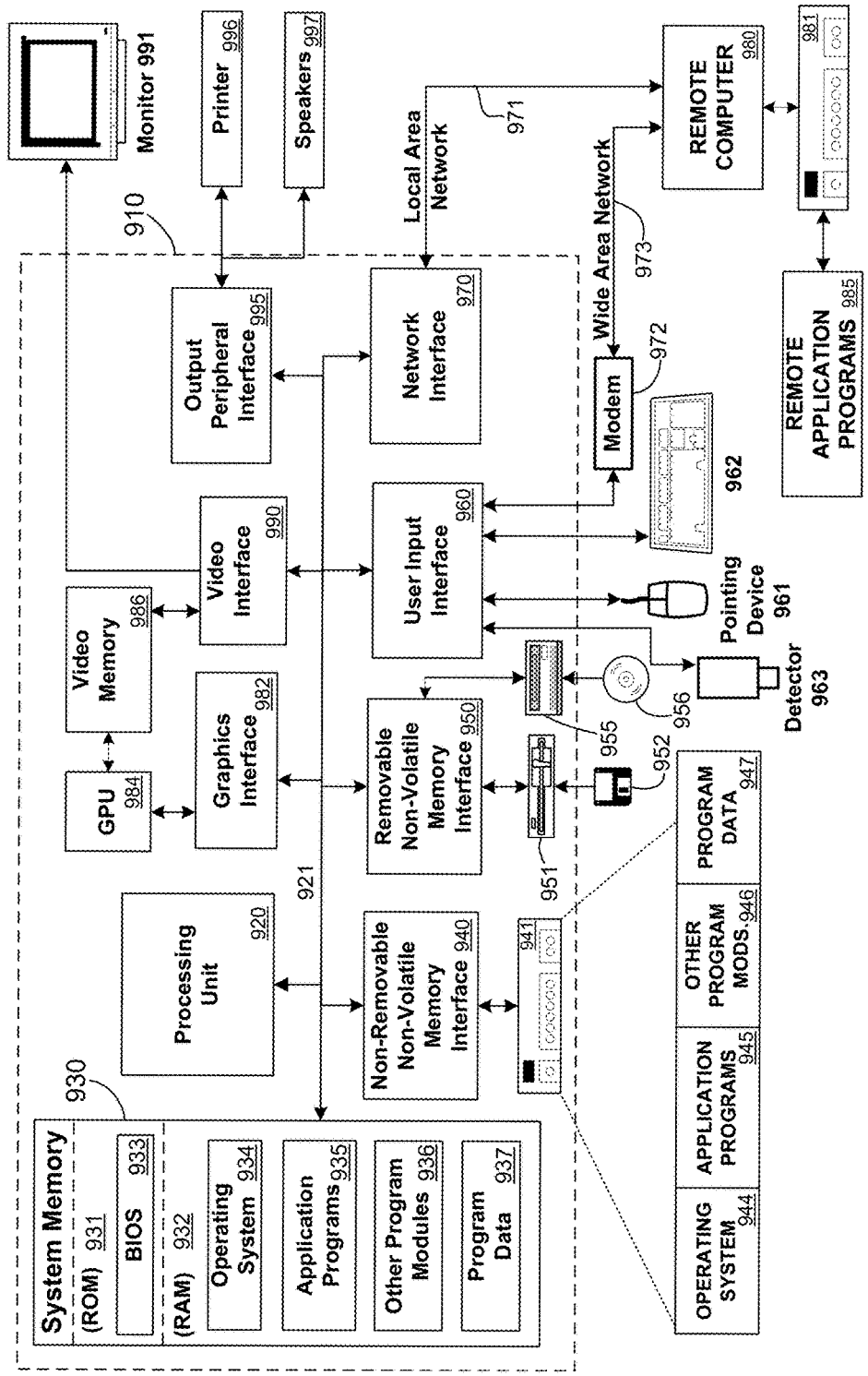
FIG. 9 is a block diagram representing an exemplary non-limiting computing device in which the present disclosure or parts thereof may be implemented.

FIG. 9 and the following discussion are intended to provide a brief general description of a suitable computing environment in which the present disclosure or parts thereof may be implemented. It should be understood, however, that handheld, portable, and other computing devices and computing objects of all kinds are contemplated for use in connection with the present disclosure, as described above. Thus, while a general purpose computer is described below, this is but one example, and the present disclosure may be implemented with other computing devices, such as a thin client having network/bus interoperability and interaction. The present disclosure may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that a stereoscopic device or system may be employed is a desirable, or suitable, environment for the stereoscopic devices or systems of the disclosure.

Although not required, the present disclosure can be implemented via an operating system, for use by a developer of services for a device or object, and/or included within application software that operates in connection with a stereoscopic device or system. Software may be described in the general context of computer-executable instructions, such as program modules, being executed by one or more computers, such as client workstations, servers, gaming consoles, mobile devices, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the present disclosure may be practiced with other computer system configurations. Other well-known computing systems, environments, and/or configurations that may be suitable for use with the present subject matter include, but are not limited to, personal computers (PCs), gaming consoles, automated teller machines, server computers, hand-held or laptop devices, multi-processor systems, microprocessor-based systems, programmable consumer electronics, network PCs, appliances, environmental control elements, minicomputers, mainframe computers, digital cameras, wireless telephones, and the like. The disclosure may also be practiced in distributed computing environments where tasks are performed by remote processing devices that are linked through a communications network/bus or other data transmission medium, as described herein in regard to FIG. 8. In a distributed computing environment, program modules may be located in both local and remote computer storage media including memory storage devices, and client nodes may in turn behave as server nodes.

FIG. 9 thus illustrates an example of a suitable computing system environment 900 in which the present subject matter or parts thereof may be implemented, although as made clear above, computing system environment 900 is only one example of a suitable computing environment and is not intended to suggest any limitation as to the scope of use or functionality of the disclosure. Devices functioning as components or parts of a stereoscopic device or system may be implemented using a system such as computing system environment 900, but those skilled in the art will recognize that there are other appropriate systems in which to implement the present disclosure. Computing system environment 900 should not be interpreted as having any dependency or requirement relating to any one or combination of components illustrated in the exemplary operating environment 900.

With reference to FIG. 9, an exemplary system for implementing the disclosure includes a general purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus.)

Computer 910 typically includes a variety of computer-readable media. Computer-readable media can be any available media that can be accessed by computer 910 and includes both volatile and nonvolatile media and removable and non-removable media. By way of example, and not limitation, computer-readable media may comprise computer storage media and communication media. Computer storage media includes both volatile and nonvolatile and removable and non-removable media implemented in any method or technology for storage of information such as computer-readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), digital versatile disks (DVD) or other optical disk storage, magnetic cassettes, magnetic tape, magnetic disk storage or other magnetic storage devices, or any other medium that can be used to store the desired information and that can accessed by computer 910. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

System memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

Computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 941 is typically connected to the system bus 921 through a non-removable memory interface such as interface 940, and magnetic disk drive 951 and optical disk drive 955 are typically connected to system bus 921 by a removable memory interface, such as interface 950.

The drives and their associated computer storage media discussed above and illustrated in FIG. 9 provide storage of computer-readable instructions, data structures, program modules and other data for computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into computer 910 through input devices such as a keyboard 962 and pointing device 961, commonly referred to as a mouse, trackball or touch pad. Alternatively, pointing device 961 may be a controller used with a gaming console. Detector 963 may communicate with computer 910 through interface 960 to provide images, video frames, and/or other detected information or data to computer 910. Detector 963 may be a camera of any type, or any other type of detection device. Other input devices (not shown) may include a microphone, joystick, game pad, satellite dish, scanner, or the like.

These and other input devices are often connected to processing unit 920 through a user input interface 960 that is coupled to system bus 921, but may be connected by other interface and bus structures, such as a parallel port, game port or a universal serial bus (USB). A graphics interface 982 may also be connected to system bus 921. One or more graphics processing units (GPUs) 984 may communicate with graphics interface 982. In this regard, GPUs 984 generally include on-chip memory storage, such as register storage and GPUs 984 communicate with a video memory 986. GPUs 984, however, are but one example of a coprocessor and thus a variety of coprocessing devices may be included in computer 910. A monitor 991 or other type of display device may also connect to system bus 921 via an interface, such as a video interface 990, which may in turn communicate with video memory 986. Monitor 991 may include stereoscopic mechanisms or components, including, but not limited to, one or more parallax barriers, lenticular lenses, or lenticular sheets. Monitor 991 may also be specially configured to render stereoscopic images, or it may be a standard monitor adapted for stereoscopic functions. It is further contemplated that computer 910 may have multiple monitors configured. For example, computer 910 may be configured with a head set, head gear, or eye glasses that have individual monitors for each eye, facilitating stereoscopic images. In addition to monitor 991, computers may also include other peripheral output devices such as speakers 997 and printer 996, which may be connected through an output peripheral interface 995.

Computer 910 may operate in a networked or distributed environment using logical connections to one or more remote computers, such as a remote computer 980. Remote computer 980 may be a personal computer, a server, a router, a network PC, a peer device or other common network node, and typically includes many or all of the elements described above relative to computer 910, although only a memory storage device 981 has been illustrated in FIG. 9. The logical connections depicted in FIG. 9 include a local area network (LAN) 971 and a wide area network (WAN) 973, but may also include other networks/buses, including wireless networks. Such networking environments are commonplace in homes, offices, enterprise-wide computer networks, intranets and the Internet.

When used in a LAN networking environment, computer 910 may be connected to LAN 971 through a network interface or adapter 970. When used in a WAN networking environment, computer 910 typically includes a modem 972 or other means for establishing communications over WAN 973, such as the Internet. Modem 972, which may be internal or external, may be connected to system bus 921 via user input interface 960, or other appropriate mechanism. In a networked environment, program modules depicted relative to computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers, including all wired and wireless means, may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of providing stereoscopic images, comprising:
   detecting on a first detector a scene-facing image;
   detecting on a second detector a user-facing image;
   determining a position of a body part of a user relative to a display based on the user-facing image;
   determining a first estimated position of a user's first eye relative to the display based on the position of the body part of the user relative to the display;
   cropping the scene-facing image to form a first portion of the scene image based on an angle formed between the first estimated position of the user's first eye and the second detector;
   compositing on the first portion of the scene image computer generated images based on the angle formed between the first estimated position of the user's first eye and the second detector;
   rendering the first portion of the scene image on the display for left eye viewing;
   determining a second estimated position of a user's second eye relative to the display based on the position of the body part of the user relative to the display;
   cropping the scene-facing image to form a second portion of the scene image based on an angle formed between the second estimated position of the user's second eye and the second detector;
   compositing on the second portion of the scene image computer generated images based on the angle formed between the second estimated position of the user's second eye and the second detector; and
   rendering the second portion of the scene image on the display for right eye viewing.

2. The method of claim 1, further comprising:
   determining an adjustment of a stereoscopic component based on the position of the body part of the user relative to the display; and
   adjusting the stereoscopic component.

3. The method of claim 1, further comprising:
   determining an adjustment of a stereoscopic component based on at least one of the first estimated position of the user's first eye or the second estimated position of the user's second eye relative to the display; and
   adjusting the stereoscopic component.

4. The method of claim 1, further comprising augmenting at least one of the first portion of the scene image or the second portion of the scene image by overlaying graphical elements on the scene image.

5. The method of claim 1, wherein the angle formed between the first estimated position of the user's first eye and the second detector is an angle formed between the first estimated position of the user's first eye and an axis extending from the second detector.

6. The method of claim 1, further comprising:
   detecting on the first detector a second scene-facing image;
   detecting on the second detector a second user-facing image;
   determining a second position of the body part of the user relative to the display based on the second user-facing image;
   determining a second estimated position of the user's first eye relative to the display based on the second position of the body part of the user relative to the display;
   determining a first portion of the second scene-facing image based on the second estimated position of the user's first eye relative to the display;
   rendering the first portion of the second scene-facing image on the display;
   determining a second estimated position of the user's second eye relative to the display based on the second position of the body part of the user relative to the display;
   determining a second portion of the second scene-facing image based on the second estimated position of the user's second eye relative to the display; and
   rendering the second portion of the second scene-facing image on the display.

7. The method of claim 1, wherein the display comprises a first display and a second display, and wherein the first portion of the scene image is rendered on the first display and the second portion of the scene image is rendered on the second display.

8. A non-transitory computer-readable storage device comprising computer-readable instructions for providing stereoscopic images, the computer-readable instructions comprising instructions for:
   detecting on a first detector a scene-facing image;
   detecting on a second detector a user-facing image;
   determining a position of a body part of a user relative to a display based on the user-facing image;
   determining a first estimated position of a user's first eye relative to the display based on the position of the body part of the user relative to the display;
   cropping the scene-facing image to form a first portion of the scene image based on an angle formed between the first estimated position of the user's first eye and the second detector;
   compositing on the first portion of the scene image computer generated images based on the angle formed between the first estimated position of the user's first eye and the second detector;
   rendering the first portion of the scene image on the display for left eye viewing;

determining a second estimated position of a user's second eye relative to the display based on the position of the body part of the user relative to the display;

cropping the scene-facing image to form a second portion of the scene image based on an angle formed between the second estimated position of the user's second eye and the second detector;

compositing on the second portion of the scene image computer generated images based on the angle formed between the second estimated position of the user's second eye and the second detector; and rendering the second portion of the scene image on the display for right eye viewing.

9. The computer-readable storage device of claim 8, wherein the instructions further comprise instructions for:

determining an adjustment of a stereoscopic component based on the position of the body part of the user relative to the display; and adjusting the stereoscopic component.

10. The computer-readable storage device of claim 8, wherein the instructions further comprise instructions for:

determining an adjustment of a stereoscopic component based on at least one of the first estimated position of the user's first eye or the second estimated position of the user's second eye relative to the display; and adjusting the stereoscopic component.

11. The computer-readable storage device of claim 8, wherein the instructions further comprise instructions for augmenting at least one of the first portion of the scene image or the second portion of the scene image by overlaying graphical elements on the scene image.

12. The computer-readable storage device of claim 8, wherein the angle formed between the first estimated position of the user's first eye and the second detector is an angle formed between the first estimated position of the user's first eye and an axis extending from the second detector.

13. The computer-readable storage device of claim 8, wherein the instructions further comprise instructions for:

detecting a second scene-facing image;

detecting a second user-facing image;

determining a second position of the body part of the user relative to the display based on the second user-facing image;

determining a second estimated position of the user's first eye relative to the display based on the second position of the body part of the user relative to the display;

determining a first portion of the second scene-facing image based on the second estimated position of the user's first eye relative to the display;

rendering the first portion of the second scene-facing image on the display;

determining a second estimated position of the user's second eye relative to the display based on the second position of the body part of the user relative to the display;

determining a second portion of the second scene-facing image based on the second estimated position of the user's second eye relative to the display; and rendering the second portion of the second scene-facing image on the display.

14. The computer-readable storage device of claim 8, wherein the display comprises a first display and a second display, and wherein the instructions for rendering the first portion of the scene image comprise instructions for rendering the first portion of the scene image on the first display, and wherein the instructions for rendering the second portion of the scene image comprise instructions for rendering the second portion of the scene image on the second display.

15. A system for providing stereoscopic images, comprising:

a first scene-facing detector configured to capture a scene-facing image;

a first user-facing detector configured to capture a user-facing image;

a display; and a processor configured to:

determine a position of a body part of a user relative to the display based on the user-facing image;

determine a first estimated position of a user's first eye relative to the display based on the position of the body part of the user relative to the display;

cropping the scene-facing image to form a first portion of the scene image based on an angle formed between the first estimated position of the user's first eye and the second detector;

compositing on the second portion of the scene image computer generated images based on the angle formed between the second estimated position of the user's second eye and the second detector;

determine a second estimated position of a user's second eye relative to the display based on the position of the body part of the user relative to the display; and cropping the scene-facing image to form a second portion of the scene image based on an angle formed between the second estimated position of the user's second eye and the second detector;

compositing on the second portion of the scene image computer generated images based on the angle formed between the second estimated position of the user's second eye and the second detector; and wherein the display is configured to:

render the first portion of the scene image for left eye viewing; and render the second portion of the scene image for right eye viewing.

16. The system of claim 15, wherein the processor is further configured to:

determine an adjustment of a stereoscopic component based on the position of the body part of the user relative to the display; and adjust the stereoscopic component.

17. The system of claim 15, wherein the processor is further configured to:

determine an adjustment of a stereoscopic component based on at least one of the first estimated position of the user's first eye or the second estimated position of the user's second eye relative to the display; and adjust the stereoscopic component.

18. The system of claim 15, wherein the processor is further configured to augment at least one of the first portion of the scene image or the second portion of the scene image by overlaying graphical elements on the scene image.

19. The system of claim 15, wherein the angle formed between the first estimated position of the user's first eye and the second detector is an angle formed between the first estimated position of the user's first eye and an axis extending from the second detector.

20. The system of claim 15, wherein the display comprises a first display and a second display, and wherein the display is configured to render the first portion of the scene image on the first display and the second portion of the scene image on the second display.

* * * * *